United States Patent
Le et al.

(10) Patent No.: US 9,919,670 B2
(45) Date of Patent: Mar. 20, 2018

(54) SYSTEM AND METHOD FOR OCCUPANT HEIGHT

(71) Applicant: Ford Global Technologies, LLC, Dearborn, MI (US)

(72) Inventors: Jialiang Le, Canton, MI (US); Manoharprasad K. Rao, Novi, MI (US); Ming Dong, Troy, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 46 days.

(21) Appl. No.: 14/827,331

(22) Filed: Aug. 17, 2015

(65) Prior Publication Data

US 2016/0368452 A1    Dec. 22, 2016

Related U.S. Application Data

(63) Continuation-in-part of application No. 14/741,575, filed on Jun. 17, 2015.

(51) Int. Cl.
| | |
|---|---|
| *B60R 21/015* | (2006.01) |
| *B60N 2/62* | (2006.01) |
| *B60R 21/16* | (2006.01) |
| *B60N 2/66* | (2006.01) |
| *B60R 21/013* | (2006.01) |
| *B60R 16/037* | (2006.01) |
| *B60N 2/02* | (2006.01) |
| *B60N 2/48* | (2006.01) |

(Continued)

(52) U.S. Cl.
CPC .. *B60R 21/01516* (2014.10); *B60R 21/01538* (2014.10); *B60R 21/01552* (2014.10); *B60N 2/02* (2013.01); *B60N 2/0252* (2013.01); *B60N 2/48* (2013.01); *B60N 2/62* (2013.01); *B60N 2/64* (2013.01); *B60N 2/66* (2013.01);

(Continued)

(58) Field of Classification Search
CPC .......... B60N 2/66; B60N 2/2209; B60N 2/62; B60N 2/0252; B60N 2/02; B60N 2/0284; B60N 2/4415; B60N 2/449; B60N 2/42754; B60N 2/68; B60N 2/48; B60N 2/4235; B60N 2/42; B60N 2/643; B60R 21/0152; B60R 21/239; B60R 21/276; B60R 21/01552; B60R 16/037; B60R 21/00; B60R 22/14; B60R 21/02; B60R 21/013;

(Continued)

(56) References Cited

U.S. PATENT DOCUMENTS

| | | |
|---|---|---|
| 5,626,359 A | 5/1997 | Steffens, Jr. et al. |
| 6,345,839 B1 | 2/2002 | Kuboki et al. |

(Continued)

FOREIGN PATENT DOCUMENTS

| | | |
|---|---|---|
| CN | 103612632 A | 3/2014 |
| DE | 102013021930 A1 | 6/2015 |

(Continued)

OTHER PUBLICATIONS

UK Search Report dated Nov. 29, 2016 (5 pages).
Notice of Allowance dated Dec. 1, 2017 for U.S. Appl. No. 14/741,575 (60 pages).

*Primary Examiner* — Behrang Badii
(74) *Attorney, Agent, or Firm* — Frank A. MacKenzie; Bejin Bieneman PLC

(57) ABSTRACT

An image is received from an image sensor. The image includes an occupant's head. A seated height of the occupant is determined based at least in part on a distance from the image sensor to the occupant's head, and a detected angle of a vehicle seat. A safety device is adjusted based at least in part on the seated height of the occupant.

11 Claims, 9 Drawing Sheets

(51) Int. Cl.
  *B60R 21/239* (2006.01)
  *B60R 21/276* (2006.01)
  *B60N 2/68* (2006.01)
  *B60N 2/64* (2006.01)
  *B60R 21/01* (2006.01)

(52) U.S. Cl.
  CPC ............... *B60N 2/68* (2013.01); *B60R 16/037* (2013.01); *B60R 21/013* (2013.01); *B60R 21/015* (2013.01); *B60R 21/0152* (2014.10); *B60R 21/16* (2013.01); *B60R 21/239* (2013.01); *B60R 21/276* (2013.01); *B60R 2021/01265* (2013.01)

(58) Field of Classification Search
  CPC ............ B60R 21/01516; B60R 21/015; B60R 21/207; B60R 21/01556; B60R 21/01538
  See application file for complete search history.

(56) References Cited

U.S. PATENT DOCUMENTS

| | | | |
|---|---|---|---|
| 7,147,246 B2 * | 12/2006 | Breed | ................ B60R 21/0152 280/735 |
| 7,370,883 B2 | 5/2008 | Basir et al. | |
| 7,740,096 B2 * | 6/2010 | Bothe | ................ B60N 2/0252 180/268 |
| 7,762,582 B2 | 7/2010 | Breed | |
| 8,606,465 B2 | 12/2013 | Wang et al. | |
| 9,308,882 B2 * | 4/2016 | Nagasawa | ............. B60R 21/013 |
| 2002/0125050 A1 | 9/2002 | Breed et al. | |
| 2007/0083311 A1 | 4/2007 | Tabe | |
| 2008/0246318 A1 * | 10/2008 | Bothe | ................ B60N 2/0252 297/217.3 |
| 2010/0121535 A1 | 5/2010 | Wang et al. | |
| 2014/0204193 A1 | 7/2014 | Zhang et al. | |
| 2014/0353048 A1 | 12/2014 | Kriger | |
| 2015/0321590 A1 * | 11/2015 | Mizoi | ...................... B60N 2/62 297/284.1 |

FOREIGN PATENT DOCUMENTS

| | | |
|---|---|---|
| EP | 1299269 B1 | 4/2004 |
| EP | 2784456 A1 | 10/2014 |
| JP | 2004338517 A | 12/2004 |
| JP | 4059258 B2 | 3/2008 |
| KR | 20130050680 | 5/2013 |
| WO | 0144026 A1 | 6/2001 |

* cited by examiner

SYSTEM AND METHOD FOR OCCUPANT HEIGHT

CROSS-REFERENCE TO RELATED APPLICATIONS

This patent application is a continuation-in-part, and claims priority to and all advantages, of U.S. patent application Ser. No. 14/741,575, filed Jun. 17, 2015, which application is hereby incorporated herein by reference in its entirety.

BACKGROUND

Vehicle passive safety systems may use occupant information, e.g. occupant height and weight. Determining occupant information in a vehicle, however, may be difficult and expensive. For example, determining the height of an occupant while seated in the vehicle is difficult because the occupant is sitting.

Occupant detection and classification systems use various metrics to detect and classify vehicle occupants. The metrics can be measured or based on a user input. Sometimes, the metrics relate to the occupant's size. For instance, an occupant detection system may determine whether an occupant is present in a vehicle based on a weight on the seat. Such systems can sometimes distinguish adult occupants from children, pets, or non-living objects.

DETAILED DESCRIPTION

Medical professionals use body mass index (BMI) to roughly evaluate a person's size relative to his or her height and weight. A person's BMI may indicate whether that person is underweight, at a normal weight, overweight, or obese. These same classifications may be used to tune certain vehicle subsystems such as a restraint system. BMI can be calculated from a person's standing weight and standing height. That information, however, is often unavailable to the vehicle unless voluntarily provided by the occupant. Even if it is voluntarily provided, a person's weight may change from time to time. Thus, simply requesting that vehicle occupants provide their heights and weights is not necessarily a reliable way to determine an occupant's height and weight.

One possible solution may have a vehicle classification system determine an occupant's BMI from his or her seated height and seated weight. An example classification system may include a processor programmed to determine the seated height and seated weight associated with the occupant and assign a classification to the occupant based at least in part on a ratio of the seated weight to the seated height. The seated height may be a function of the vertical height adjusted by a seat angle. The seated weight may include a weight applied to the seat, therefore excluding the majority of the occupant's legs. The ratio of the seated weight to the seated height may be referred to as a seated body mass index or seated BMI. In some instances, the seated BMI may be a function of the ratio of the seated weight to the seated height squared.

The seated BMI may be related to the more traditional BMI used by medical professionals. Thus, the seated BMI may be used to determine whether a particular occupant is underweight, at a normal weight, overweight, or obese. Various vehicle subsystems may be tuned accordingly.

The elements shown may take many different forms and include multiple and/or alternate components and facilities. The example components illustrated are not intended to be limiting. Indeed, additional or alternative components and/or implementations may be used.

Figure 1:
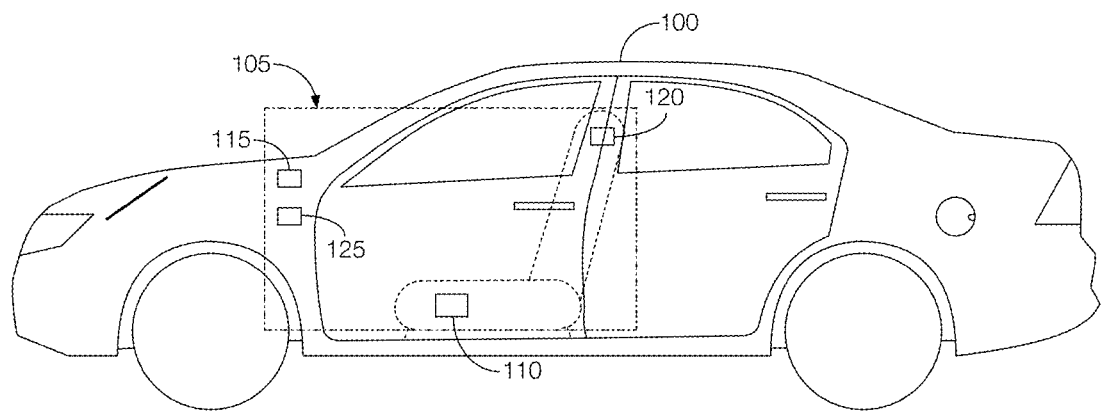
FIG. 1 illustrates an example vehicle with a system that can assign a classification to an occupant based on the occupant's seated weight and seated height.

As illustrated in FIG. 1, the host vehicle 100 includes an occupant classification system 105 that can classify occupants according to the occupant's size without requiring the occupant to provide his or her height and weight. The occupant classification system 105 may measure the occupant's seated height, measure the occupant's seated weight, determine a ratio of the occupant's seated weight to seated height, and assign a classification based, at least in part, on the ratio. Although illustrated as a sedan, the host vehicle 100 may include any passenger or commercial automobile such as a car, a truck, a sport utility vehicle, a crossover vehicle, a van, a minivan, a taxi, a bus, etc. In some possible approaches, as discussed below, the vehicle is an autonomous vehicle configured to operate in an autonomous (e.g., driverless) mode, a partially autonomous mode, and/or a non-autonomous mode.

Figure 2A:
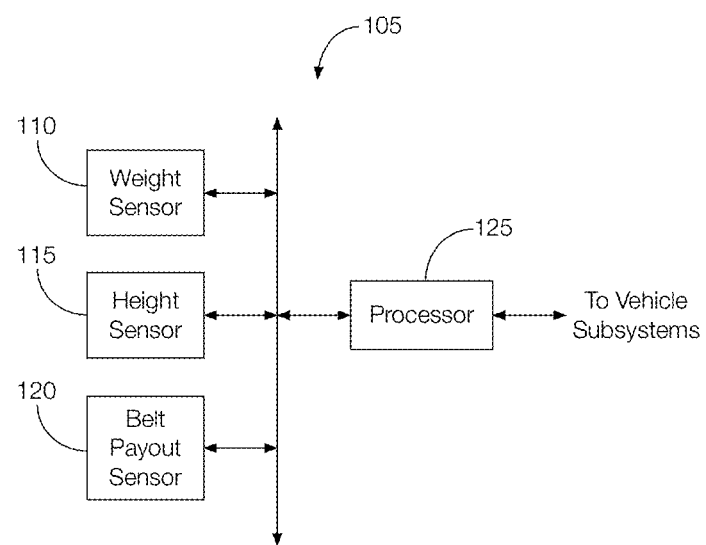
FIG. 2A is a block diagram of the system of FIG. 1.

As illustrated in FIG. 2A, the occupant classification system 105 may include a weight sensor 110, a height sensor 115, a belt payout sensor 120, and a processor 125.

The weight sensor 110 may include an electronic computing device programmed to measure a seated weight of the occupant. The weight sensor 110 may be embedded into a vehicle seat, such as the driver seat. In some possible approaches, the weight sensor 110 may be programmed to measure the amount of weight applied to the seat. This weight may be referred to as the "seated weight" since it represents the weight of the occupant while seated. The occupant's seated weight may be different from the occupant's standing weight since the seated weight may exclude the weight of the majority of the occupant's legs. The weight sensor 110 may be further programmed to output a seated weight signal representing the seated weight measured by the weight sensor 110.

The height sensor 115 may include an electronic computing device programmed to measure a seated height of the occupant. The seated height may include vertical height that includes a distance from, e.g., the top of the seat to a top of the occupant's head. The seated height, therefore, may be based on a difference between the height of the top of the occupant's head and the height of the top of the seat. The height of the top of the seat may be determined based on the height of the seat from the vehicle floor, a thickness of the seat, or both. The electronic computing device of the height sensor 115 may determine the seat angle from the input of a seatback angle sensor (not shown) incorporated into the seat back. The height of the top of the occupant's head may be determined by, e.g., a vision sensor, such as a camera, incorporated into the height sensor 115. The height sensor 115 may be programmed to measure or estimate the height of the top of the occupant's head by detecting, e.g., the height of the occupant's eye level. Because seat angle may affect the height of the top of the occupant's head, the height sensor 115 may be programmed to account for the seat angle and adjust the height of the top of the occupant's head according to the seat angle. The height sensor 115 may be programmed to output a seated height signal representing the seated height measured by the height sensor 115.

The belt payout sensor 120 may include an electronic computing device programmed to determine a seatbelt payout length. The seatbelt payout length may include the length of the seatbelt that is unraveled when the occupant is in the seat with the seatbelt buckled. The belt payout sensor 120 may be programed to output a belt payout signal representing the length of the seatbelt payout.

The processor 125 may include an electronic computing device programmed to determine a classification for the occupant. The classification may be based on, e.g., the seated weight determined by the weight sensor 110, the seated height determined by the height sensor 115, and the length of the seatbelt payout determined by the belt payout sensor 120. For instance, the processor 125 may be programmed to receive the seated weight signal, the seated height signal, and the belt payout signal. In some possible implementations, the processor 125 may be programmed to determine a seated body mass index, which may be a function of the seated weight and seated height. For instance, the seated body mass index may be the ratio of the seated weight to seated height squared as shown in Equation (1), where seated weight is measured in kilograms and seated height is measured in meters.

$$BMI_{Seated} = f\left(\frac{\text{Seated Weight}}{\text{Seated Height}^2}\right) \quad (1)$$

The processor 125 may be programmed to assign a classification to the occupant based on the seated BMI. Example classifications may include underweight, normal weight, overweight, or obese.

In some instances, the processor 125 may be programmed to consider the length of the seatbelt payout, as indicated by the belt payout signal, when assigning a classification to the occupant. That is, the length of the seatbelt payout may confirm the assigned classification (i.e., a larger belt payout length may indicate a larger occupant). Alternatively, the processor 125 may be programmed to adjust the classification according to the belt payout length. For instance, occupants with athletic builds may have a relatively high seated BMI but may not be as large as other people with the same weight and height. Thus, where the seated BMI indicates a larger occupant but the belt payout length suggests a smaller occupant, the processor 125 may be programmed to classify the occupant as having a normal weight.

The processor 125 may be programmed to tune one or more vehicle subsystems in accordance with the assigned classification. For example, the processor 125 may be programmed to generate and output command signals that command the vehicle subsystems to adjust one or more settings in accordance with the assigned classification. An example of such a vehicle subsystem may include, e.g., a control module such as the restraint control module, the body control module, etc. The command signals may indicate whether one or more airbags should be deployed, how to adjust the position of the side or rear view minors, the seat position, the steering wheel height, etc.

Figure 2B:
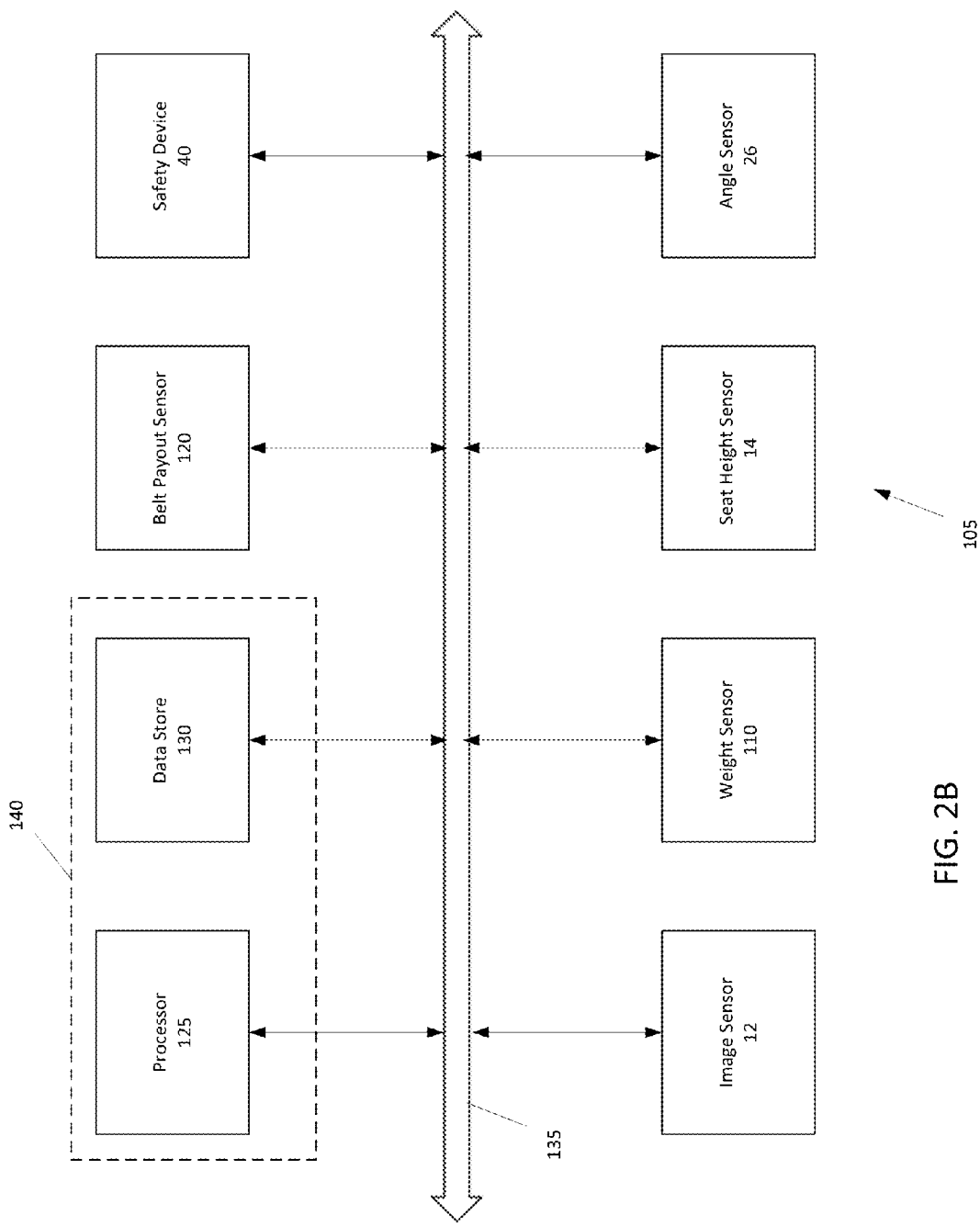
FIG. 2B is another exemplary block diagram of the system of FIG. 1.

In another example, shown in FIG. 2B, the occupant classification system 105 may include a seat height sensor 14, an image sensor 12, an angle sensor 26, a safety device 40, the weight sensor 110, a data store 130, the belt payout sensor 120, and the processor 125 communicatively connected via a vehicle communication network bus 135. The processor 125 and the data store 130 may be included in a computing device 140.

The data store 130 may be of any known type, e.g., hard disk drives, solid-state drives, servers, or any volatile or non-volatile media. The data store 130 may store data sent over the bus 135.

The bus 135, e.g., one or more known mechanisms for network communications in the vehicle 10, e.g. a controller area network (CAN) bus or the like, such as is known, may be used to provide various communications, including data from the image sensor 12 and the angle sensor 26 to the processor 125.

The safety device 40 may be, e.g., a seat belt, a bolster, an airbag, etc. The safety device 40 may receive instructions from the processor 125 to adjust based on the seated occupant height, e.g., adjust belt payout rate or belt position by adjusting a D-ring position, etc. The belt position may be, e.g., the height of the seat belt in a vertical direction, a location of the seat belt in a longitudinal direction toward the front or rear of the vehicle 100, a location of the seat belt in a lateral direction into or out from the vehicle 100, and/or rotation of the seat belt, e.g. the orientation of the D-ring through which the seat belt may be threaded, as is known, relative to the longitudinal, lateral, and/or vertical axes.

Figure 3:
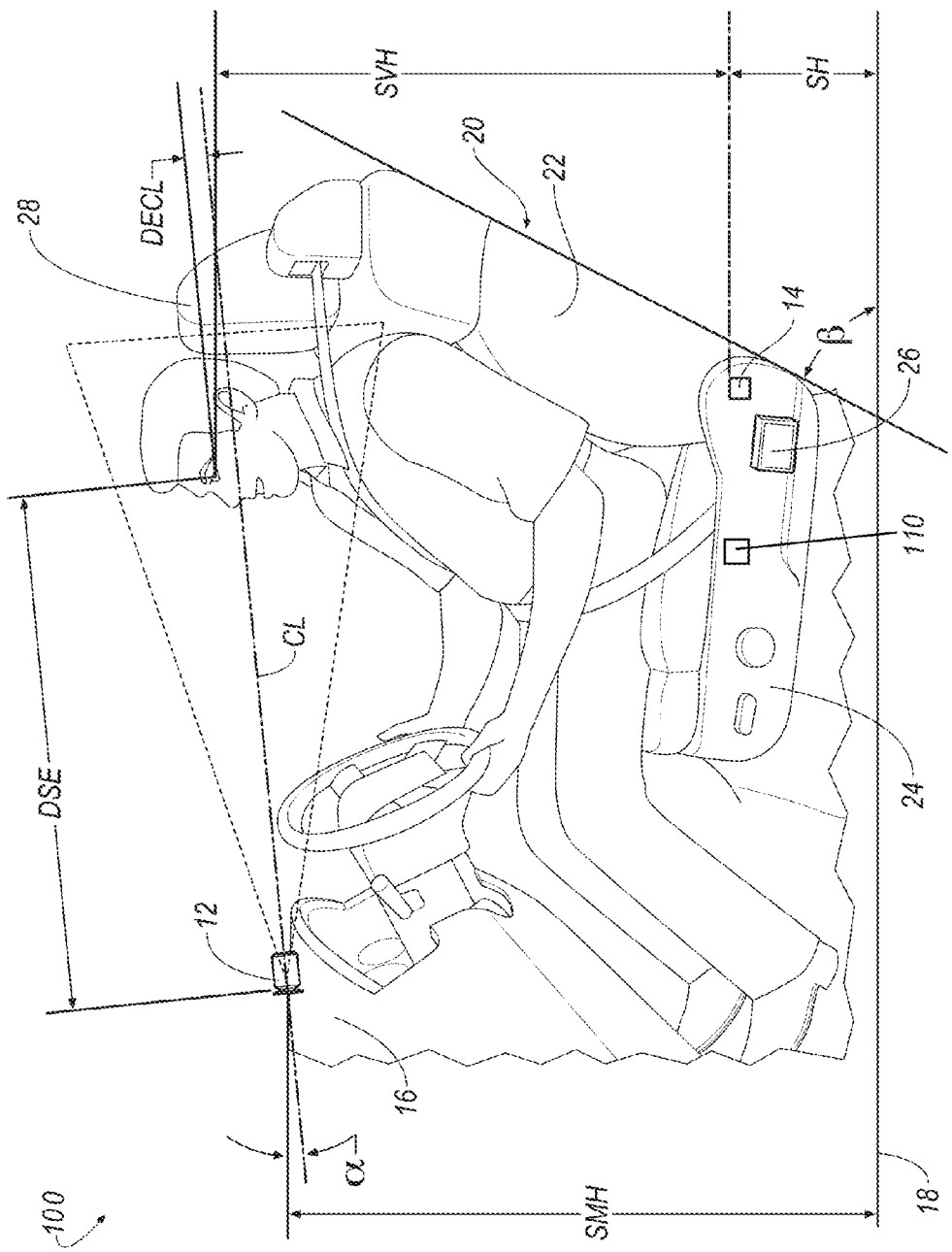
FIG. 3 is a view of an exemplary system for determining a height of an occupant in a vehicle.

FIG. 3 illustrates the system 105 configured to determine seated height in the vehicle 100. The system 105 includes the image sensor 12, an instrument panel 16, and a vehicle floor 18. The system 105 further includes a seat 20 including a seat back 22, a seat base 24, the seat height sensor 14, an angle sensor 26, the weight sensor 110, and a headrest 28. The vehicle 100 is typically a land-based vehicle with three or more wheels. However, the vehicle 100 could be, e.g., a watercraft or an aircraft.

The image sensor 12 may be a 3D camera, e.g. a time of flight camera, which is configured to capture an image and measure the image distance from the camera. The image sensor 12 may also be a stereo camera, a complementary metal-oxide semiconductor (CMOS) sensor augmented with infrared sensors for measuring the distance of the image from the camera, a charge-coupled device (CCD) sensor, etc. The image sensor 12 collects data, e.g. an image, of the occupant and the seat 20 and the distance of the center of the image from the image sensor 12.

The image sensor 12 is typically mounted to the instrument panel 16. The image sensor 12 is positioned at a predetermined distance above the vehicle floor 18. Typically, the vehicle floor 18 is an interior vehicle surface on which the occupant's feet rest in conventional operation, but because the vehicle floor 18 is often not planar, the vehicle floor 18 for the purposes of the system 105 is defined as a predetermined plane parallel to the ground from which other parts of the system 105 are measured. The approximation of the vehicle floor 18 to a plane allows for consistent measurement distances for the image sensor 12, the seat height sensor 14, etc., and thus a consistent measurement of the occupant's height.

The image sensor 12 is mounted at a mounted angle α at a height SMH above the vehicle floor 18. The angle α is an angel between the vehicle floor 18 and an axis CL of a camera lens included in the image sensor 12. The image sensor 12 is mounted at a distance DSE from the occupant's eyes, e.g., the distance DSE is a distance from an image sensor 12 to the occupant's eyes.

The seat 20 supports the occupant during conventional operation of the vehicle 10. Specifically, the seat back 22 supports the occupant's back and shoulders, the seat base 24 supports the occupant's lower body, and the headrest 28 supports the occupant's head. The seat back 22, the seat base 24, and the headrest 28 may be conventionally constructed of, e.g., metal, foam, leather, vinyl, fabric, etc. The top of the seat base 24 is located at a seat height SH from the vehicle floor 18.

The seat height sensor 14 measures the height SH between the vehicle floor 18 and the seat height sensor 14. The seat height sensor 14 may be located close to the top surface of the seat base 24. The angle sensor 26 is installed on the seat back 22 and rotates as the seat back 22 rotates. The angle sensor 26 measures the rotation relative to the fixed seat base 24, measuring an angle between the seat base 24 and the seat back 22.

The angle sensor 26 measures the angle between the seat base 24 and the seat back 22. The angle sensor 26 measurement may be calibrated to the vehicle floor 18 to determine the seat back angle β. The angle sensor 26 may be of any known type, e.g., a Hall Effect sensor. The measurements from the seat height sensor 14 and the angle sensor 26 are used in conjunction with the images from the image sensor 12 to determine the seated occupant height.

The seat 20 further includes the weight sensor 110. The weight sensor 110 may be installed in the seat base 24 to measure the seated weight of the occupant.

Figure 4:
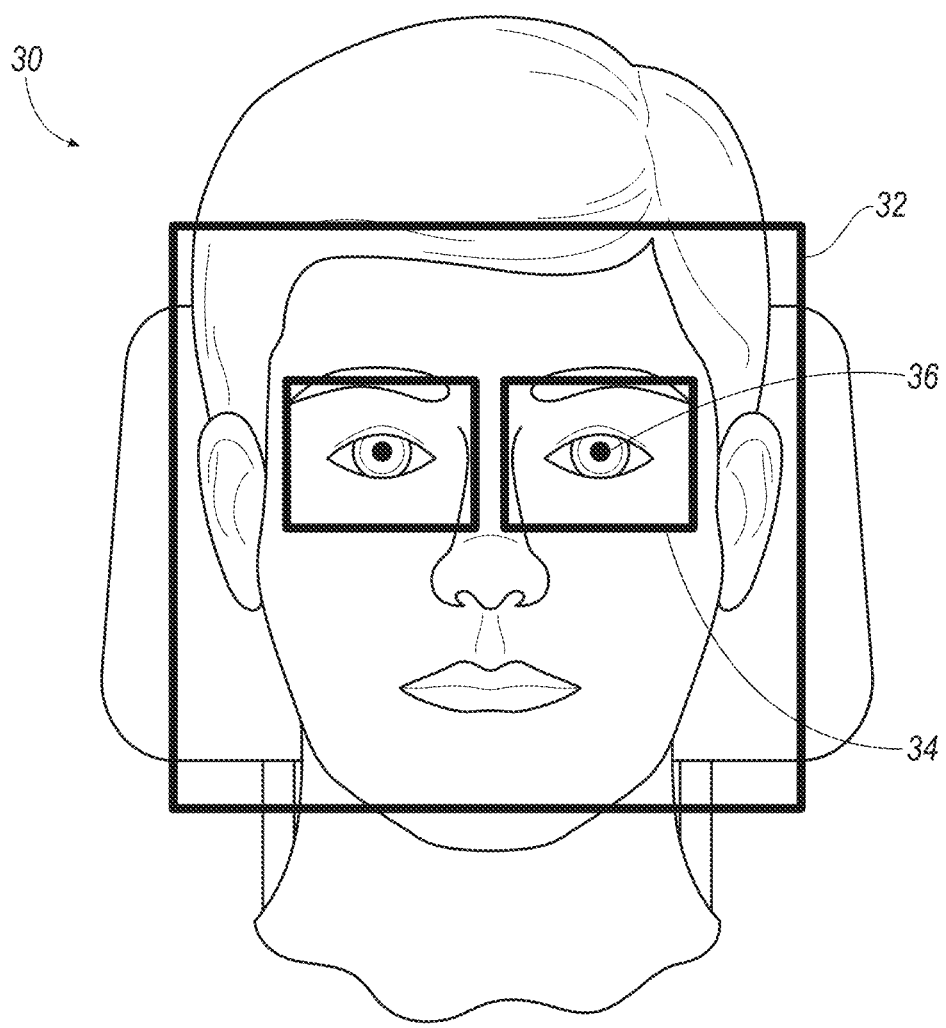
FIG. 4 illustrates an exemplary image providing height determination information.

FIG. 4 illustrates the image 30 of an occupant captured by the image sensor 12. The image 30 includes a facial region 32 corresponding to the occupant's face. The facial region 32 includes two eye regions 34 corresponding to the occupant's eyes. The computing device 140 identifies the facial region 32 using known image processing techniques.

Each eye region 34 includes a pupil 36 corresponding to the occupant's pupils. Specifically, the computing device 140 identifies the pupils 36 using known image processing techniques.

Figure 5:
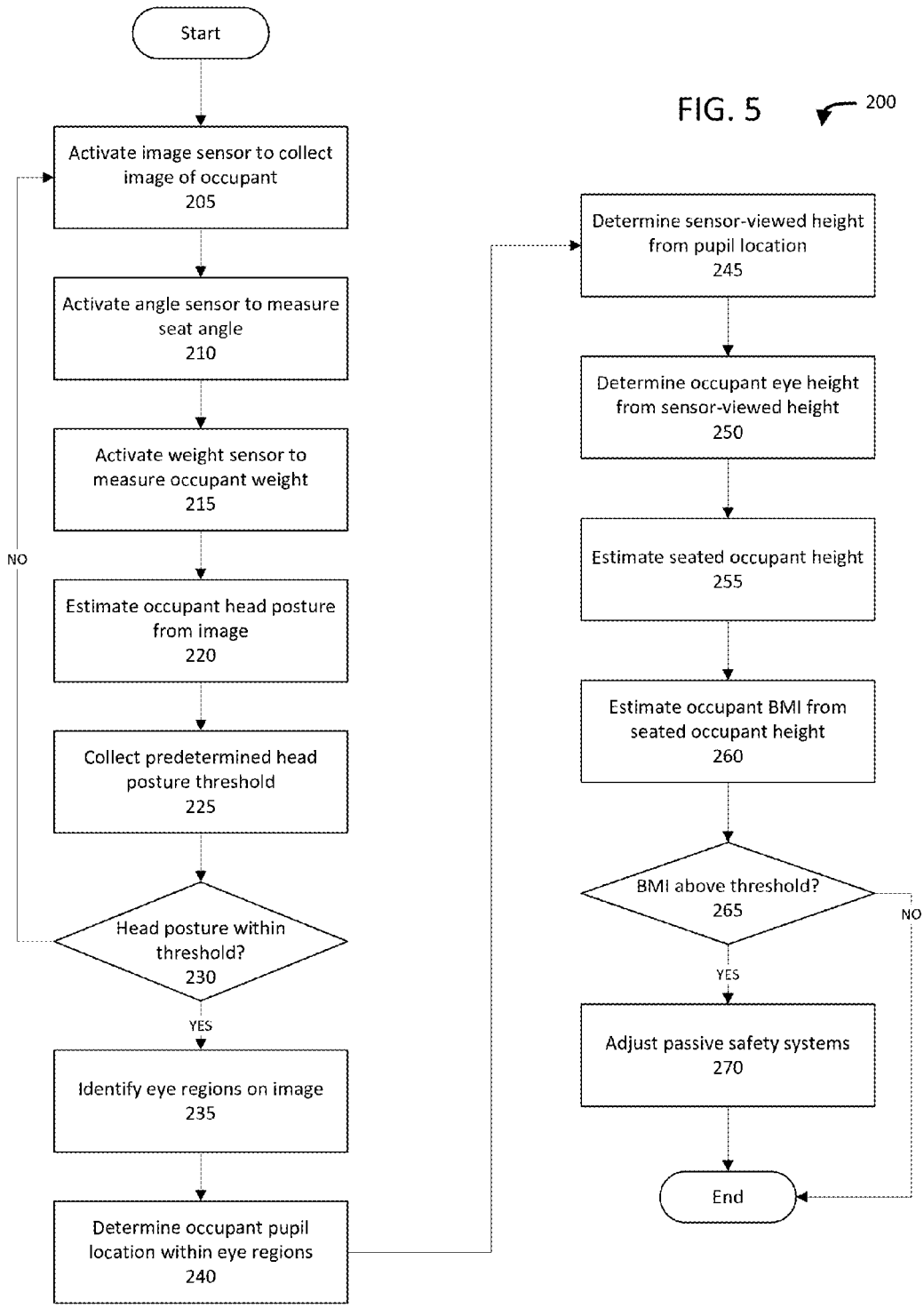
FIG. 5 is a process flow diagram for determining a height of the occupant and adjusting a safety system based on the height of the occupant.

FIG. 5 illustrates a process 200 for determining the standing occupant height SOH. The process 200 starts in a block 205, where the computing device 140 acquires an image 30 of the occupant from the image sensor 12 and stores the image 30 in the data store 130.

Next, in a block 210, the computing device 140 acquires the seat back angle β between the seat back 22 and the vehicle floor 18 from the angle sensor 26.

Next, in a block 215, the computing device 140 acquires the occupant's weight from the weight sensor 110.

Next, in a block 220, the computing device 140 estimates a head posture of the occupant based on the image. Specifically, the computing device 140 analyzes the image 30, including occupant's pupils and shoulders, to determine if the occupant is looking forward, i.e., toward the image sensor 12. The image sensor 12 requires a clear view of the occupant's face, and if the occupant's head is turned, the image sensor 12 may require a new image.

Next, in a block 225, the computing device 140 collects a predetermined posture threshold from the data store 130. Specifically, the occupant's head may be turned up to a certain amount to determine the occupant height, as determined by the posture threshold.

Next, in a block 230, the computing device 140 determines whether the occupant's head posture is within the posture threshold, that is, if the occupant's head is facing forward sufficient to determine the seated occupant height. If so, then the process 200 moves to a block 235. Otherwise, the process 200 returns to the block 205 where another image 30 is taken with the image sensor 12.

In the block 235, the computing device 140 identifies the eye regions in the image 30 using known image analysis techniques.

Next, in a block 240, using the image 30 and known image analysis techniques, the computing device 140 determines the occupant's pupil location and the distance DSE between the image sensor 12 and the occupant's eyes. The computing device 140 also determines the distance DECL between the occupant's pupils and the axis CL of the image sensor 12.

Next, in a block 245, the computing device 140 determines a sensor-viewed height SVH. Specifically, the computing device 140 determines a sensor-viewed eye height SVH as $$SVH = (SMH - SH) + DSE\sin\alpha + \frac{DECL}{|\cos\alpha|} \quad (2)$$

where SMH is the sensor mounted height, the distance between the vehicle floor 18 and the image sensor 12, SH is the seat height, i.e., a distance from the vehicle floor 18 to the seat height sensor 14, DSE is the distance between the image sensor 12 and the occupant's eyes, DECL is the distance between the occupant's eyes and the axis CL of the image sensor 12, and α is the angle between the axis CL and the vehicle floor 18.

Next, in a block 250, assuming the occupant's upper body and head are aligned with the seat back 22, as described in the system of FIGS. 1-4, the computing device determines the seated occupant eye height OEH as $$OEH = \frac{SVH}{|\sin\beta|} \quad (3)$$

where β is the seat back angle.

Next, in a block 255, with the seated occupant eye height OEH, the computing device 140 determines the standing occupant height SOH as $$SOH = OEH \cdot C \quad (4)$$

where C is a multiplication factor based on the relationship between seated eye height OEH and standing occupant height SOH. For example, standing eye height on an average male may be about 93.4% of total height, and standing eye height of an average female may be about 92.6% of total height. The seated occupant eye height OEH may be approximated as the difference between the standing eye height and the height between a person's waist and the floor, which may be about 46.3% of total height for an average male and 46% of the total height of an average female. Thus, in one example, C may be $$\frac{1}{0.463}$$

or about 2.16. That is, the total height of the occupant may be about 2.16 times that of the seated occupant eye height OEH. The value of C may be adjusted based on known biological calculations and the characteristics of the driver.

The system 105 may also determine the occupant seated height OSH. Similar to the standing occupant height SOH, the occupant seated height OSH may be determined from the seated occupant eye height OEH and a multiplication factor C as in Equation (4). However, the occupant seated height OSH will require a different value for the multiplication factor C. For example, the difference between the total standing height and standing eye height for an average male may be about 6.6% of total height, and the difference between total height and standing eye height for an average female may be about 7.4% of total height. A typical value of C for an average male for determining occupant seated height OSH may be $$\frac{0.463 + 0.066}{0.463}$$

or about 1.142.

Next, in a block 260, the computing device 140 calculates a mass index for the occupant. Specifically, the computing device 140 may use the occupant height and weight, as determined from a weight sensor, to calculate an occupant's body mass index (BMI). The occupant's BMI is a measure of the ratio between the occupant's weight and height, and may be determined using the occupant's standing and/or seated height, and the occupant's standing and/or seated weight, as shown in FIGS. 6A-6C.

Next, in a block 265, the computing device 140 determines whether the occupant BMI is above a predetermined threshold. For example, a BMI value above 30, sometimes referred to as "obese", may require adjustment of the safety device 40. If the BMI is above the predetermined threshold, the process 200 move to a block 270. Otherwise, the process 200 ends.

In the block 270, the computing device 140 adjusts the safety device 40 to accommodate the occupant, and the process 200 ends. For example, the computing device 140 may adjust seat belt payout and/or seat belt position by adjusting the D-ring position, e.g., by moving the D-ring substantially vertically, e.g., up and down a vehicle pillar, for an occupant with a high BMI.

Figure 6A:
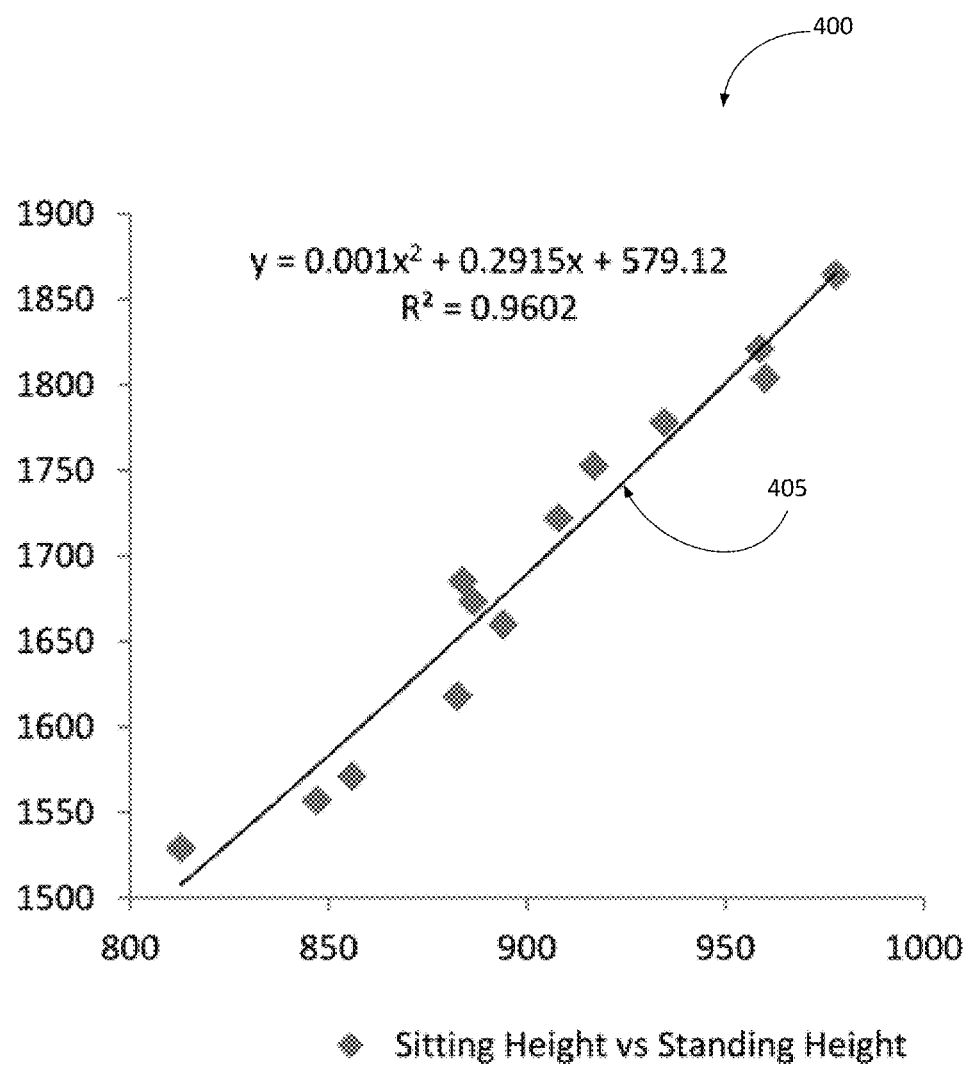
FIGS. 6A-6C are graphs showing example relationships between various metrics that may be used to determine a mass index of the occupant.
Figure 6B:
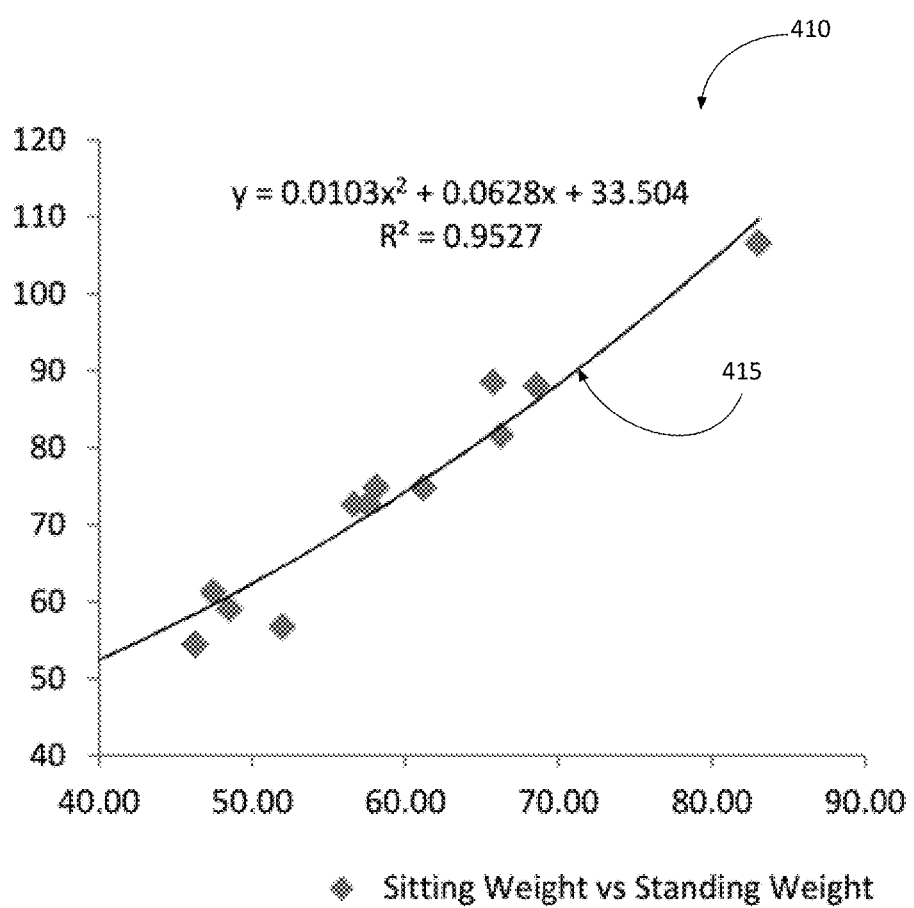
Figure 6C:
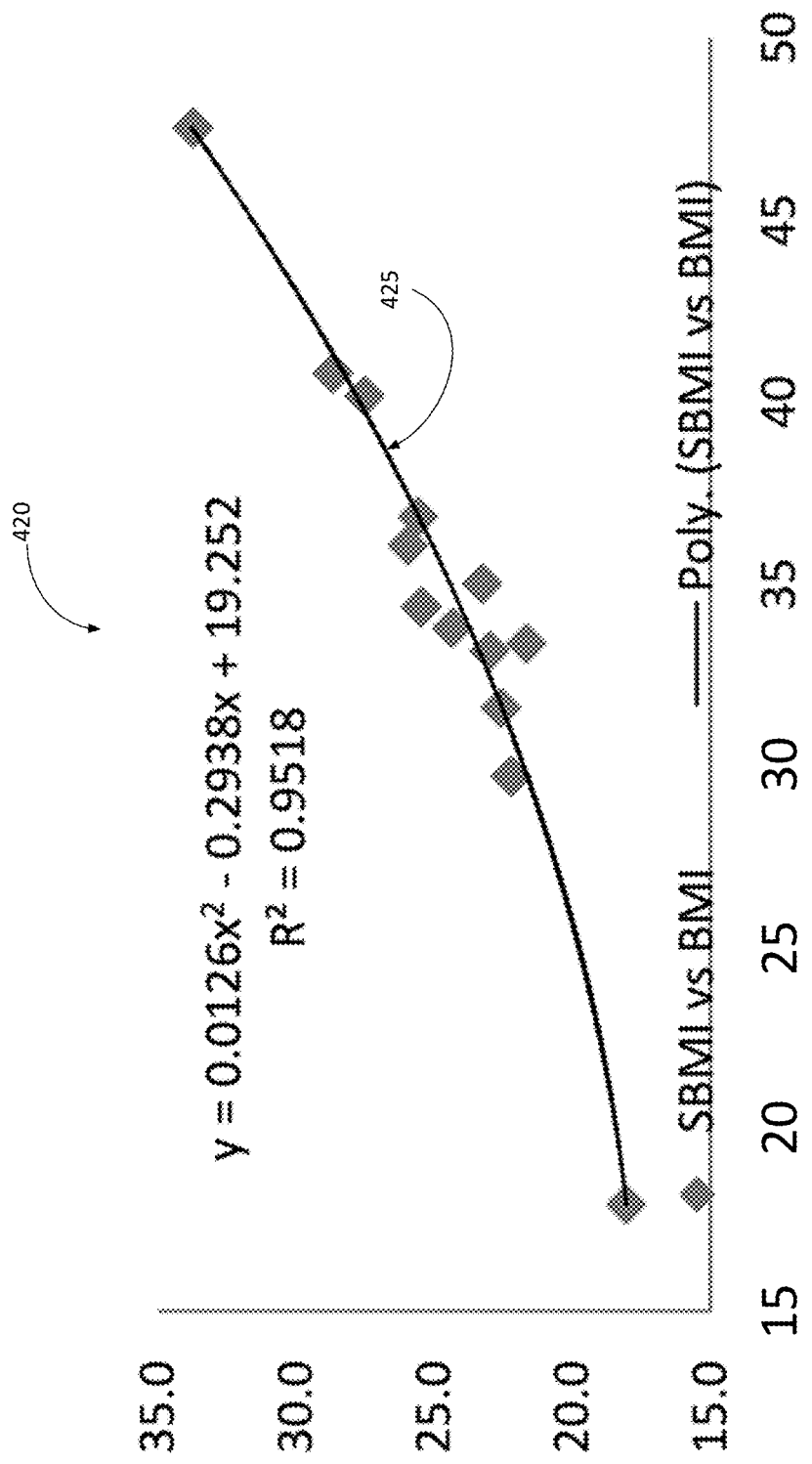

FIGS. 6A-6C are graphs showing example relationships between various metrics that may be used to classify vehicle occupants, and that may be used in the foregoing processes. FIG. 6A shows a graph 400 relating standing height (in millimeters) to seated height (in millimeters). The Y-axis represents standing height and the X-axis represents seated height. The trendline 405 illustrates an example parametric relationship between occupant standing height and occupant seated height.

Referring now to FIG. 6B, the graph 410 relates standing weight (in kilograms) to seated weight (in kilograms). The Y-axis represents standing weight and the X-axis represents seated weight. The trendline 415 illustrates an example parametric relationship between the standing weight and the seated weight.

FIG. 6C is a graph 420 relating seated BMI to standing BMI. The Y-axis represents standing BMI and the X-axis represents seated BMI calculated in accordance with, e.g., Equation (1). The trendline 425 illustrates an example parametric relationship between the standing BMI and the seated BMI. This relationship may be used to build a database, table, or other relationship relating occupant classifications, such as underweight, normal weight, overweight, and obese, to various seated BMI values based on established BMI classifications.

The occupant classification system 105, therefore, may use the traditional BMI classifications to classify a vehicle occupant according to his or her seated weight and seated height. By measuring the seated weight and seated height, the occupant classification system 105 can assign the classification without a user input providing such information. Alternatively, if such information is provided, the occupant classification system 105 may use the seated BMI to confirm the classification, or vice versa. Settings associated with various vehicle subsystems, such as the airbags, minors, etc., may be tuned according to the assigned classification.

Figure 7:
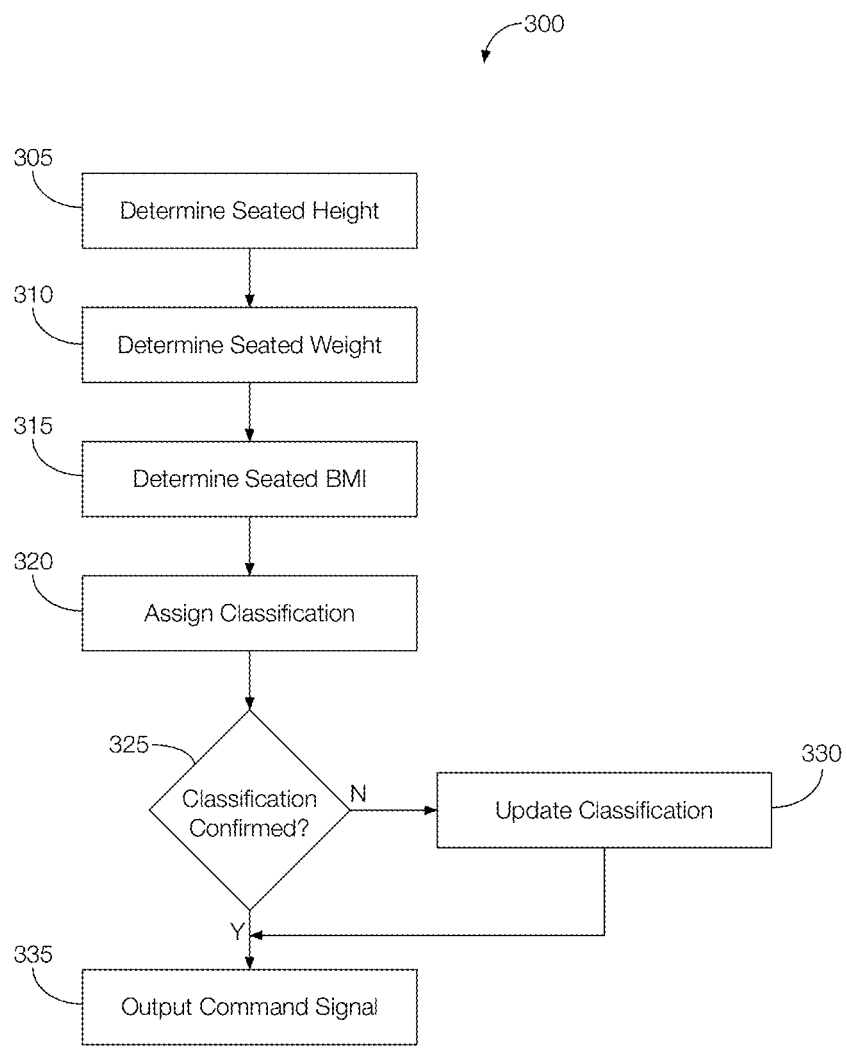
FIG. 7 is a process flow diagram for determining and updating the classification of the occupant.

FIG. 7 is a flowchart of an example process 300 that may be executed by the occupant classification system 105 for classifying occupants according to the occupant's size without requiring the occupant to provide his or her height and weight.

At block 305, the occupant classification system 105 may determine the occupant's seated height. The seated height may be determined from, e.g., the process 200 of FIG. 5. The seated height may alternatively be determined from, e.g., the seated height signal generated by the height sensor 115. Measuring the seated height may include the height sensor 115 determining a vertical height of the occupant while the occupant is seated, determining a seat angle (e.g. the angle of the seat back relative to the floor), and adjusting the vertical height according to the seat angle. The height sensor 115 may generate an output the seated height representing the adjusted seat height. The processor 125 may receive the seated height signal and determine the seated height of the occupant based on the seated height signal.

At block 310, the occupant classification system 105 may determine the occupant's seated weight. The seated weight may be determined from, e.g., the seated weight signal generated by the weight sensor 110. The weight sensor 110 may measure the occupant's seated weight and generated the seated weight signal accordingly. The processor 125 may receive the seated weight signal and determine the seated weight of the occupant based on the seated weight signal.

At block 315, the occupant classification system 105 may determine the seated BMI based on, e.g., a ratio of the seated weight to the seated height. For instance, the seated BMI may be a function of the ratio of the seated weight to the seated height squared as discussed above with respect to Equation (1). The processor 125 may determine the ratio.

At block 320, the occupant classification system 105 may assign a classification to the occupant based on the seated BMI determined at block 315. The classification may indicate that the occupant is underweight, at a normal weight, overweight, or obese. The processor 125 may assign the classification based on which classification is associated with the occupant's seated BMI determined at block 315. The classification may be selected from a table, database, etc., relating various seated BMI values to various classifications.

At decision block 325, the occupant classification system 105 may confirm the classification assigned at block 320. Confirming the classification may include, e.g., the processor 125 receiving the belt payout signal representing the amount of seatbelt payout. The processor 125 may determine that the occupant classification needs to be adjusted if, e.g., the amount of the seatbelt payout does not match the size of other occupant's with the same seated BMI as the present occupant. For example, for occupants with athletic builds, the seatbelt payout may be low despite the occupant having a relatively high seated BMI. In this example, the seatbelt payout is inconsistent with the seated BMI. The processor 125 may confirm the classification if, e.g., the amount of the seatbelt payout is consistent with the size of other occupants with the same seated BMI as the present occupant. If the classification is not confirmed, the process 300 may proceed to block 330. If the classification is confirmed, the process 300 may proceed to block 335.

At block 330, the occupant classification system 105 may update the classification. For instance, the processor 125 may base the updated classification on the amount of the seatbelt payout as well as the ratio of the seated height to the seated weight. The updated classification may be selected form a table, database, etc., relating various seated BMI values, various seatbelt payout amounts, and various classifications. The process 300 may proceed to block 335.

At block 335, the occupant classification system 105 may generate and output a command signal to one or more vehicle subsystems, e.g. the safety device 40. The command signal, which may be generated and output by the processor 125, may command the subsystem to adjust one or more settings in accordance with the assigned classification. Example vehicle subsystems may include, e.g., a control module such as the restraint control module, the body control module, etc. The command signals may indicate whether one or more airbags should be deployed, how to adjust the position of the side or rear view minors, the seat position, the steering wheel height, or the like.

The process 300 may end after block 335. In some instances, however, the process 300 may periodically begin again or return to a previous block, such as block 305, so that the classifications may be continually reevaluated and updated while the host vehicle 100 is operational.

In general, the computing systems and/or devices described may employ any of a number of computer operating systems, including, but by no means limited to, versions and/or varieties of the Ford Sync® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance. Examples of computing devices include, without limitation, an on-board vehicle computer, a computer workstation, a server, a desktop, notebook, laptop, or handheld computer, or some other computing system and/or device.

Computing devices such as those discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc.

In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

As used herein, the adverb "substantially" means that a shape, structure, measurement, quantity, time, etc. may deviate from an exact described geometry, distance, measurement, quantity, time, etc., because of imperfections in materials, machining, manufacturing, etc. In the drawings, the same reference numbers indicate the same elements. Further, some or all of these elements could be changed. With regard to the components, processes, systems, methods, etc. described herein, it should be understood that these are provided for the purpose of illustrating certain embodiments, and should in no way be construed so as to limit the claimed invention.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 200, one or more of the steps 205-270 could be omitted, or the steps could be executed in a different order than shown in FIG. 5. In other words, the descriptions of systems and/or processes herein are provided for the purpose of illustrating certain embodiments, and should in no way be construed so as to limit the disclosed subject matter.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system, comprising a computer including a processor and a memory, the memory storing instructions executable by the processor to:
   receive an image including an occupant's head from an image sensor;
   determine a seated height of the occupant from a top of a vehicle seat base, the seated height based at least in part on a distance from the image sensor to the occupant's head determined from the image, an eye height from the top of the vehicle seat base that is based on the distance from the image sensor to the occupant's head, and a detected angle of a vehicle seat;
   receive an occupant weight from a weight sensor;
   calculate a mass index based on the seated height and the occupant weight; and
   adjust a seat belt payout rate of a safety belt based at least in part on the mass index.

2. The system of claim 1, wherein the instructions further include instructions to locate eye pupils in the image of the occupant.

3. The system of claim 2, wherein the instructions further include instructions to determine the seated height of the occupant based at least in part on a distance from the image sensor to the pupils.

4. The system of claim 1, wherein the instructions further include instructions to determine a head posture angle based on the image of the occupant.

5. The system of claim 1, wherein the safety device is a seat belt, and the instructions include instructions to adjust a seat belt position based on the mass index.

6. A system, comprising:
   an image sensor;
   a seat including a seat back, a seat base, and an angle sensor disposed on the seat back; and
   a computer including a processor and a memory, the memory storing instructions executable by the processor to:
   receive an image including an occupant's head from the image sensor;
   determine a seated height of the occupant from a top of the seat base, the seated height based at least in part on a distance from the image sensor to the occupant's head determined from the image, an eye height from the top of the seat base that is based on the distance from the image sensor to the occupant's head, and a detected angle of the seat;
   receive an occupant weight from a weight sensor;
   calculate a mass index based on the seated height and the occupant weight; and
   adjust a seat belt payout rate of a safety belt based at least in part on the mass index.

7. The system of claim 6, wherein the instructions further include instructions to determine a head posture angle based on the image of the occupant.

8. The system of claim 6, wherein the safety device is a seat belt, and the instructions include instructions to adjust a seat belt position based on the mass index.

9. A method, comprising:
   receiving an image including an occupant's head from an image sensor;
   determining a seated height of the occupant from a top of a vehicle seat base, the seated height based at least in part on a distance from the image sensor to the occupant's head determined from the image, an eye height from the top of the vehicle seat base that is based on the distance from the image sensor to the occupant's head, and a detected angle of a vehicle seat;
   receive an occupant weight from a weight sensor;
   calculate a mass index based on the seated height and the occupant weight; and
   adjust a seat belt payout rate of a safety belt based at least in part on the mass index.

10. The method of claim 9, further comprising locating eye pupils in the image of the occupant.

11. The method of claim 9, wherein the safety device is a seat belt, the method further comprising adjusting a seat belt position based on the mass index.

* * * * *